United States Patent
Combs et al.

(10) Patent No.: US 9,703,566 B2
(45) Date of Patent: Jul. 11, 2017

(54) SHARING TLB MAPPINGS BETWEEN CONTEXTS

(75) Inventors: Jonathan D. Combs, Austin, TX (US); Jason W. Brandt, Austin, TX (US); Benjamin C. Chaffin, Portland, OR (US); Julio Gago, Barcelona (ES); Andrew F. Glew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 13/997,789

(22) PCT Filed: Dec. 29, 2011
(Under 37 CFR 1.47)

(86) PCT No.: PCT/US2011/067925
§ 371 (c)(1),
(2), (4) Date: Jun. 25, 2013

(87) PCT Pub. No.: WO2013/101104
PCT Pub. Date: Jul. 4, 2013

(65) Prior Publication Data
US 2014/0223141 A1    Aug. 7, 2014

(51) Int. Cl.
*G06F 12/00* (2006.01)
*G06F 9/38* (2006.01)
*G06F 12/1036* (2016.01)

(52) U.S. Cl.
CPC .......... *G06F 9/3814* (2013.01); *G06F 9/3851* (2013.01); *G06F 12/1036* (2013.01)

(58) Field of Classification Search
None
See application file for complete search history.

(56) References Cited

U.S. PATENT DOCUMENTS

| | | |
|---|---|---|
| 7,430,643 B2 | 9/2008 | Jordan et al. |
| 8,645,666 B2 | 2/2014 | Glew |
| (Continued) | | |

FOREIGN PATENT DOCUMENTS

| | | |
|---|---|---|
| EP | 1 622 033 | 2/2006 |
| TW | I253015 B | 4/2006 |

OTHER PUBLICATIONS

PCT International Search Report for PCT Counterpart Application No. PCT/US2011/067925, 3 pgs., (Sep. 26, 2012).

(Continued)

*Primary Examiner* — Duc Doan
(74) *Attorney, Agent, or Firm* — Nicholson De Vos Webster & Elliott, LLP

(57) ABSTRACT

In some implementations, a processor may include a data structure, such as a translation lookaside buffer, that includes an entry containing first mapping information having a virtual address and a first context associated with a first thread. Control logic may receive a request for second mapping information having the virtual address and a second context associated with a second thread. The control logic may determine whether the second mapping information associated with the second context is equivalent to the first mapping information in the entry of the data structure. If the second mapping information is equivalent to the first mapping information, the control logic may associate the second thread with the first mapping information contained in the entry of the data structure to share the entry between the first thread and the second thread.

20 Claims, 7 Drawing Sheets

(56) References Cited

U.S. PATENT DOCUMENTS

| | | | |
|---|---|---|---|
| 2002/0144081 A1* | 10/2002 | Willis | G06F 12/1027 711/206 |
| 2003/0018877 A1* | 1/2003 | Gaskins | G06F 12/1027 711/207 |
| 2005/0027960 A1 | 2/2005 | DeMent et al. | |
| 2006/0161760 A1 | 7/2006 | Jordan et al. | |
| 2008/0162868 A1* | 7/2008 | Glew | 711/203 |

OTHER PUBLICATIONS

PCT Written Opinion of the International Searching Authority for PCT Counterpart Application No. PCT/US2011/067925, 5 pgs., (Sep. 26, 2012).

PCT Notification concerning Transmittal of International Preliminary Report on Patentability (Chapter I of the Patent Cooperation Treaty) for PCT Counterpart Application No. PCT/US2011/067925, 7 pgs., (Jul. 10, 2014).

Office action and Search Report with Summarized English Translation from Taiwan Patent Application No. 101149319, mailed Apr. 30, 2015, 17 pages.

Office action with English Translation from Taiwan Patent Application No. 101149319, mailed Nov. 30, 2015, 9 pages.

\* cited by examiner

SHARING TLB MAPPINGS BETWEEN CONTEXTS

CROSS-REFERENCE TO RELATED APPLICATION

This patent application is a U.S. National Phase Application under 35 U.S.C. §371 of International Application No. PCT/US2011/067925, filed Dec. 29, 2011, entitled SHARING TLB MAPPINGS BETWEEN CONTEXTS.

TECHNICAL FIELD

This disclosure relates to the technical field of microprocessors, such as microprocessors to share one or more data structures between contexts during multithread processing.

BACKGROUND ART

In systems which permit multiprocessing, including systems that permit multithreading, multiple threads or software processes may share a common address space. Accordingly, in some cases, identical virtual addresses may translate into identical physical addresses. For instance, to prevent mistakes in accessing high-speed storage, such as a cache memory, the data may be stored according to physical addresses instead of virtual addresses used by the software processes. A translation lookaside buffer (TLB) is a data structure that may be used to improve virtual address translation speed. For example, a processor may use a TLB to map virtual and physical address spaces. The TLB is typically implemented as content-addressable memory in which a virtual address serves as a search key and a corresponding physical address is a search result. If a requested address is present in the TLB, the search yields a match quickly (a TLB hit), and the retrieved physical address can be used to access memory. On the other hand, if the requested address is not in the TLB (a TLB miss), a process called a page walk may be performed to read the contents of a page table and determine the physical address. After the physical address is determined, the virtual-address-to-physical-address mapping may be entered into the TLB.

If a cache is accessed by multiple logical processors or multiple threads of execution, the size of the TLB may be increased to allow storage of virtual address translations for each logical processor or thread. Unfortunately, the time required to perform a virtual address translation increases with the size of the TLB, thereby reducing access speed and overall system performance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
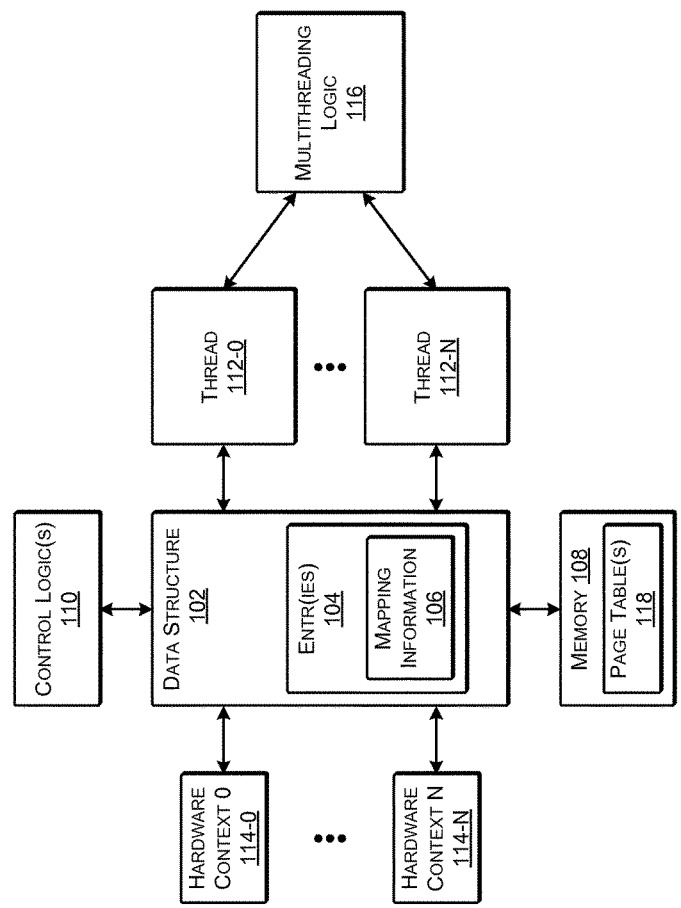
FIG. 1 illustrates an example abstraction of a processor to share a TLB entry among multiple contexts according to some implementations.

This disclosure includes techniques and arrangements for sharing data structure entries between two or more contexts. According to some implementations herein, a processor may enable several contexts to run contemporaneously. In such an arrangement, sharing of internal structures, such as data structures, between two or more of contexts can increase efficiency and conserve resources. For example, enabling two or more hardware contexts to share a single entry in a data structure may help to maximize throughput without increasing the size of such structures. Such sharing can effectively reduce the size of the structure, reduce power consumption, and so forth. Accordingly, some implementations herein enable sharing of translation lookaside buffer (TLB) entries among two or more hardware contexts by checking for actual equivalence instead of predicting compatibility or other similar conventional techniques.

In some examples, an entry of a data structure may maintain mapping information associated with a first context. The mapping information may include a first virtual address, a first physical address and zero or more first attributes associated with the first context. For instance, the data structure entry may maintain information on various attributes associated with the physical address, the virtual address and/or the associated context such as read, write, or other access permission attributes, a processing privilege attribute, page attributes (e.g., size of the page, or the type or cacheability of the memory contained in a page), memory location attributes, and the like. A control logic that manages the TLB may receive a request for second mapping information associated with a second context. For instance, the second mapping information may include the first virtual address. The control logic may determine whether the second mapping information is equivalent to the first mapping information based at least in part on a comparison of the first physical address and the zero or more first attributes with a second physical address and zero or more second attributes associated with the second context. For example, the control logic may send a request to obtain the second mapping information for the second context, such as from a page walk. In response, the control logic may receive the second mapping information including the second physical address and zero or more second attributes associated with the second context and that map to the first virtual address.

The control logic may compare the first mapping information with the second mapping information to determine whether the mappings are equivalent. Equivalence may be indicated when the results of the shared mapping are indistinguishable from the results that would be obtained if each context had separate mapping information in separate entries. For example, the virtual address and physical address should be equivalent for both the first context and the second context, as well as any other information used for producing the same mapping results, such as one or more attributes associated with the mapping information.

When the results of the comparison show that the first mapping information is equivalent to the second mapping information, the second context may be associated with the first mapping information contained in the exiting entry of the data structure. Accordingly, rather than creating a new entry in the data structure, the existing entry is merely associated with the second context in addition to already being associated with the first context. Thus, when a subsequent request for mapping information that includes the first virtual address is received in association with either of the first context or the second context, the first mapping information from the data structure entry may be returned immediately upon location of the entry in the data structure and verification of association with the respective first or second context.

Consequently, implementations herein provide for comparing two instances of mapping information associated with two different hardware contexts or threads. Additionally, context information may be added to an existing mapping information to allow the existing mapping information to be shared by two or more software contexts using any suitable form of hardware context identifier to indicate if the mapping is usable by that software context. Furthermore, implementations herein enable updating the shared mapping information so that the number of contexts sharing the mapping information may be incremented or decremented as suitable. Thus, some examples enable a table lookup of existing mappings using a virtual address range and a hardware context identifier to possibly locate a TLB hit.

Some implementations are described in the environment of a TLB used in connection with a plurality of hardware contexts within a processor. However, the implementations herein are not limited to the particular examples provided, and may be extended to other types of data structures, contexts, processor architectures, and the like, as will be apparent to those of skill in the art in light of the disclosure herein.

Example Processors

FIG. 1 illustrates an example abstraction of a processor 100 including a data structure 102 having one or more entries 104 that contain mapping information 106. In some implementations, the processor 10 may be a unitary processor, while in other implementations, the processor 100 may be a processing core of multiple cores of a processor or of multiple processors formed on a single die, multiple dies, or any combination thereof. For example, the processor 100 may be, or may be a processing core of, a CPU (central processing unit), a GPU (graphics processing unit), or other processing logic or a combination thereof.

The mapping information 106 may provide a mapping between two address spaces. For example, the data structure 102 may be a translation lookaside buffer (TLB) to provide a mapping between a virtual address space used by one or more processes and a physical address space corresponding to a memory 108. For example, the memory 108 may be or may include one or more cache memories or other memories, storage devices, computer readable media, or the like, used by the processor 100 during execution of processes.

The data structure 102 may embody any of numerous different structural configurations, such as in terms of size and associativity, as well as numerous different configurations for the content of the data structure 102. For example, the data structure 102 may enable looking up or locating the presence of a given virtual address range. Furthermore, if information about a particular virtual address range is present, the data structure 102 may contain mapping information 106 that can be used to map virtual addresses from that range into the corresponding physical addresses. The data structure 102 may further contain information about the properties of a given address range, such as the size of the address range, the access permissions, and various other attributes, as mentioned above. The data structure 102 also enables adding of such information for virtual address ranges that are not yet present, as well as removal of mapping information according to various different retirement or flushing techniques. Furthermore, when a mapping for a particular virtual address or virtual address range is not found, new mapping information corresponding to the virtual address or virtual address range may be fetched, such as by performing a page walk or the like.

The processor 100 may further include control logic(s) 110 for managing the data structure 102 such as for adding or removing entries 104 and/or updating mapping information 106 in particular entries 104. In some instances, the control logic 110 may be implemented by one or more controllers, such as a microcontroller or cache controller, one or more dedicated circuits or hardware, microcode, an operating system, or any combination thereof. Accordingly, implementations herein are not limited to the particular examples illustrated in the figures for implementing the control logic 110, and may include any suitable arrangements or techniques for providing the functionality described herein to manage and access the data structure 102.

The processor 100 may be used to perform processing for a plurality of execution threads 112, such as threads 112-0, . . . , 112-N (where N is an integer≥1). In some examples, a plurality of the execution threads 112 may be executed contemporaneously, such as for carrying out simultaneous multithreading (SMT). SMT is a processor configuration to support multiple threads having separate hardware contexts 114 to dispatch instructions in parallel on a single processor or processor core. In some instances, SMT may create multiple logical processors within a single physical processor or processor core. Thus, a first thread 112-1 and a second thread 112-N may execute on respective first and second logical processors provided by a processor or processor core. For example, a multithreading logic 116 may control the creation and execution of the threads 112 and the allocation of corresponding hardware contexts 114. The multithreading logic 116 may be included with a multi-sequencer, such as having a sequencer for each thread (not shown in FIG. 1), although other technologies may alternatively be used for executing multiple threads 112 on the processor 100.

In the illustrated example of FIG. 1, each thread 112-0, . . . , 112-N has a corresponding separate hardware context 114-0, . . . , 114-N. For example, in some instances the separate hardware context 114 may include separate thread-specific register files (not shown in FIG. 1) allocated to each particular thread. Furthermore, hardware contexts 114 may include other hardware elements allocated to respective threads 112, with the register files being just one example for discussion purposes.

According to some implementations herein, an entry 104 in the data structure 102 may be shared by multiple threads 112 having different hardware contexts 114. For example, by checking for equivalence between mapping information 106 for two or more hardware contexts 114, the control logic 110 may determine whether a particular entry 104 in the data structure 102 may be shared by two or more threads 112. In some instances, the control logic 110 may compare mapping information 106 in an existing entry 104 associated with a first thread 112 with information about a new mapping associated with a second thread 112.

Further, in some examples, the physical address space may correspond to one or more page tables 118 having page table physical addresses. For example, the control logic 110 may perform, or may send a request to another logic unit to perform, a page walk, i.e., performing a lookup in one or more of the page tables 118 to determine a physical address and any attributes corresponding to a particular instance of the mapping information 106. The control logic 110 may obtain or receive the response mapping information and compare the physical address and any attributes with those in the existing entry 104 to determine whether the mapping information is equivalent.

When equivalence is found, the control logic 110 may add information to the existing entry 104 to enable the mapping information 106 contained in the entry 104 to be shared by two or more hardware contexts 114 or threads 112. For example, the control logic 110 may add a hardware context identifier or thread identifier for each hardware context/ thread able to share the mapping information 106 in the entry 104 to indicate that the mapping information 106 is usable by that hardware context/thread. The control logic 110 may further update the sharing information, when appropriate, so that the number of contexts sharing mapping information for a particular entry is incremented or decremented in accordance with changes in the mapping information and/or one or more of the hardware contexts 114. As one example, an operating system or other logic may replace a particular software context or thread corresponding to a given hardware context with a different software context to be executed on the processor. Thus, in some implementations, mapping information from the software context being evicted may be invalidated without affecting other contexts running contemporaneously on the processor. In that case, hardware and/or software, such as control logic 110, may remove (i.e., decrement) a particular hardware context from one or more of the data structure entries 104 so that the new software context is able to populate the data structure 102 with new mappings without interference from the evicted software context. Accordingly, implementations herein provide a data structure 102 that enables lookup of existing mappings using a virtual address range and a hardware context for any of the hardware contexts associated with a particular entry 104.

Figure 2:
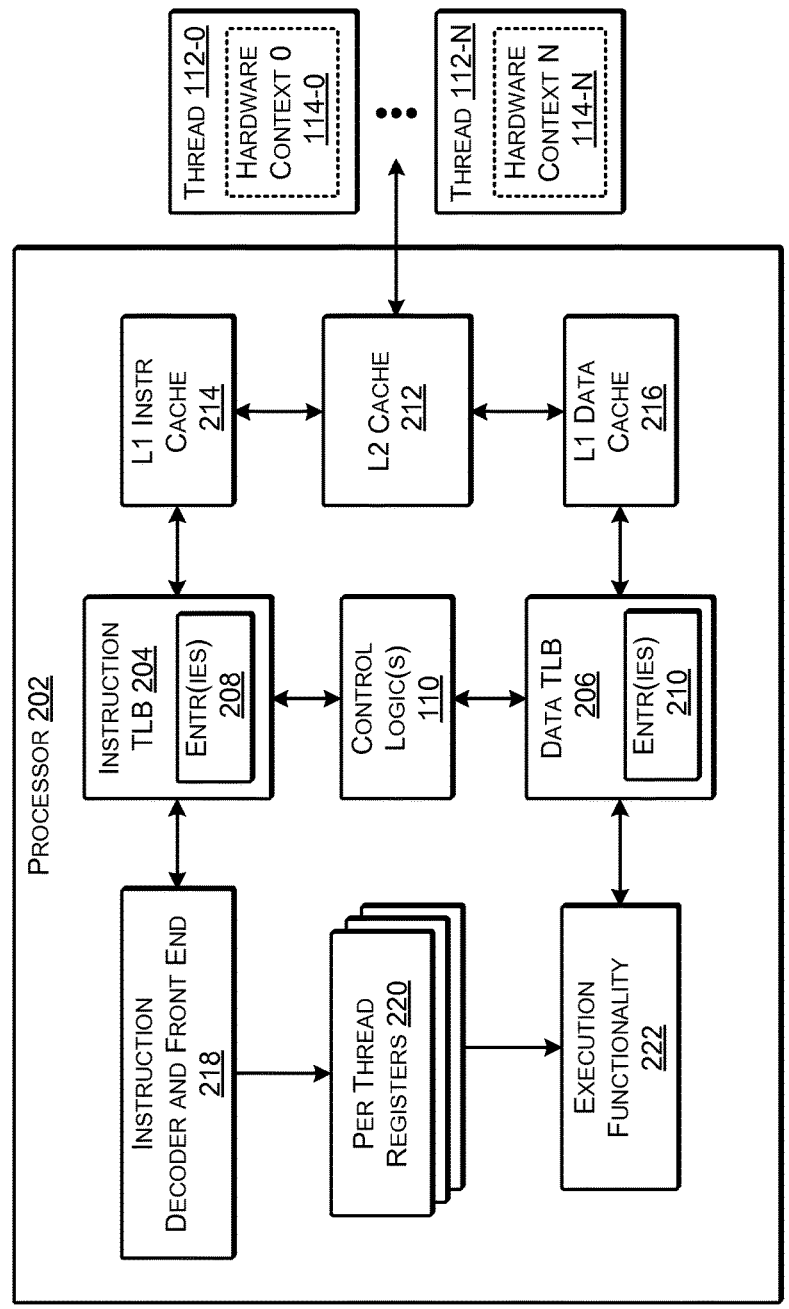
FIG. 2 illustrates an example architecture of a processor to share a TLB entry among multiple contexts according to some implementations.

FIG. 2 illustrates an example architecture 200 of a processor 202 to enable sharing of TLB entries according to some implementations herein. One or more TLBs may be included in the processor or processor core represented by the processor 202. In the illustrated example, processor 202 includes an instruction TLB 204 and a data TLB 206. The instruction TLB 204 may include one or more entries 208, and the data TLB 206 may include one or more entries 210. Thus, a plurality of TLBs of different types and or hierarchies may be included in the processor 202. The TLBs 204, 206 may store the most recently used page-directory and page-table entries as mapping information. As mentioned above, TLBs 204, 206 may speed up memory accesses when paging is enabled by reducing the number of memory accesses that are required to read the page tables stored in system memory. Control logic 110, as described above, may be implemented in the processor 202 to enable sharing of entries 208 and/or 210 contained in the TLBs 204, 206, respectively.

For simplicity of illustration, only a single instruction TLB 204 and a single data TLB 206 are illustrated in the example of FIG. 2. However, in other examples (not shown in FIG. 2), the TLBs in the processor 202 may be divided into different groups and may include different hierarchical levels within a group, such as a first instruction TLB for smaller pages and a second instruction TLB for larger pages; a first data TLB for smaller pages and a second data TLB for large pages; and so forth, as well as other types of TLBs. In some implementations, the TLBs 204, 206 are normally active only in protected mode with paging enabled. Thus, when paging is disabled or the processor 202 is in real-address mode, the TLBs 204, 206 may maintain their contents until explicitly or implicitly flushed.

The processor 202 may further include one or more cache memories. In the illustrated example, the processor 202 includes an L2 cache 212, an L1 instruction cache 214, and an L1 data cache 216. The L1 instruction cache 214 may provide instructions to an instruction decoder and front end 218. In addition, the processor 202 may include a plurality of per thread registers 220, such that specific registers 220 are allocated as particular hardware contexts 114 corresponding to respective particular threads 112 to be executed on the processor 202. Consequently, the thread 112-0 may be allocated one or more registers 220 as being included in the hardware context 114-0, and the thread 112-N may be allocated one or more other registers 220 as being included in the hardware context 114-N. The processor 202 may additionally include one or more execution units or other execution functionality 222 that may be operated to execute the threads 112, such as in a contemporaneous or simultaneous multithreading fashion as discussed above. Furthermore, the processor 202 may include numerous other structures and functional components that are not shown in FIG. 2 for clarity of illustration. Accordingly, implementations herein are not limited to the particular configuration illustrated.

As one example, suppose that the instruction decoder and front end 218 requests mapping information corresponding to a particular virtual address to process a particular thread 112, e.g., thread 112-0, using the corresponding hardware context 114-0. Furthermore, suppose that the control logic 110 checks the instruction TLB 204 and locates an entry 208 matching the requested virtual address but associated with a different thread e.g., thread 112-N and hardware context 114-N. Because the entry 208 is associated with a different hardware context, the control logic 110 does not use the mapping information in the entry 208 and instead may fetch or may send a request to have a fetch performed for the mapping information in a conventional manner, such as from a page walk. The received mapping information may include a physical address and one or more attributes, such as read or write permissions, or the other attributes described above. The control logic 110 may return the mapping information including the physical address and the attribute information. Furthermore, the control logic 110 may compare the received physical address and attribute information with the existing entry 208 in the TLB 204 to determine equivalence. If the physical address matches the physical address contained in the existing entry 208 and the attribute information matches the attribute information contained in the existing entry 208 then the existing entry 208 may also be associated with the thread 112-N and the hardware context 114-N. Consequently, when a subsequent request is received in the context of the thread 112-N and the hardware context 114-N, the control logic 110 may immediately respond with the mapping information from the existing entry 208. On the other hand, if the physical address does not match the physical address contained in the existing entry 208 or if the attribute information does not match the attribute information contained in the existing entry 208, then the control logic 110 may create a separate entry 208 in the TLB 204 associated with the thread 112-N and the hardware context 114-N.

Example TLB and Framework

Figure 3:
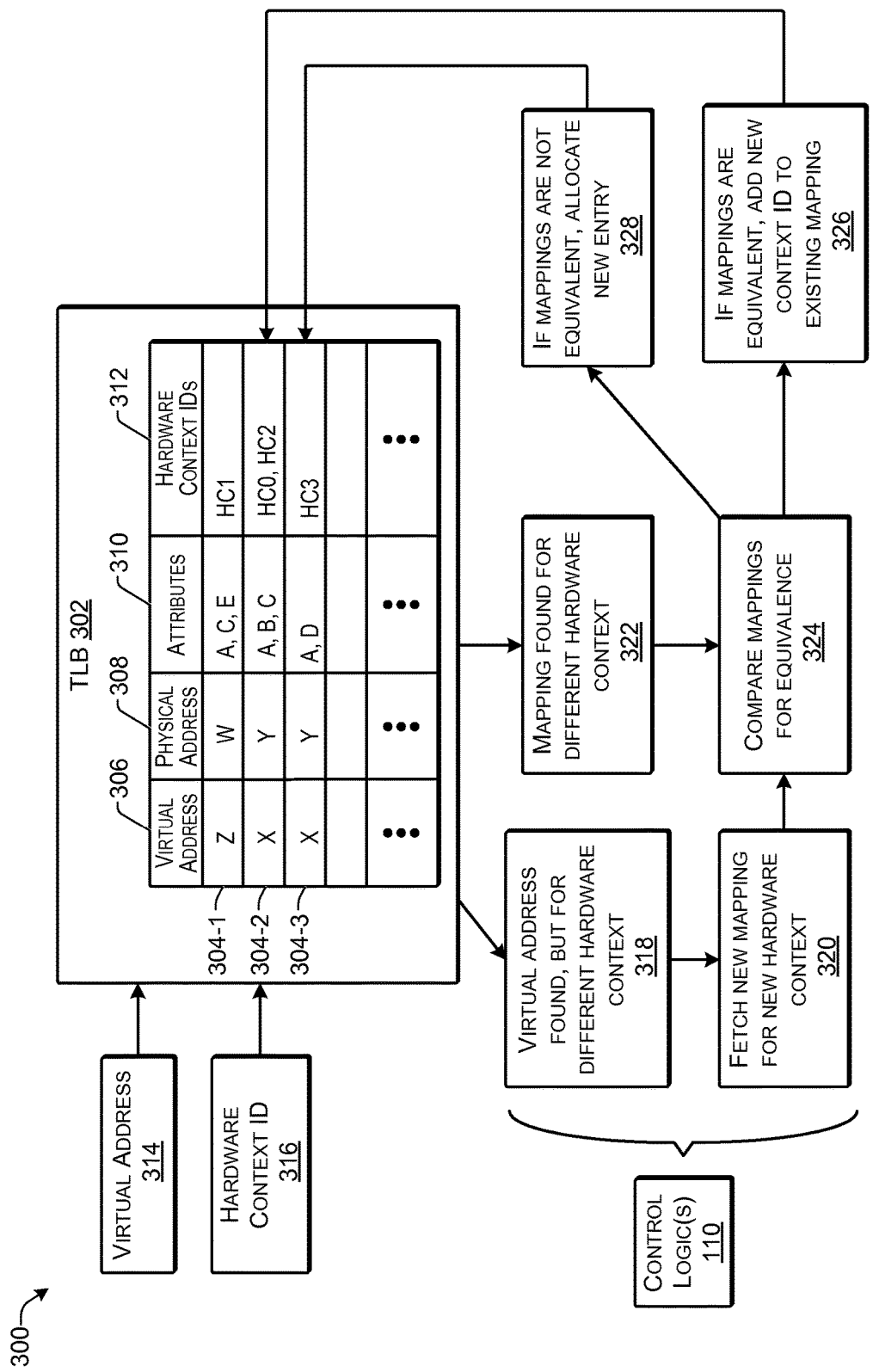
FIG. 3 illustrates an example TLB and a framework for determining whether to share a TLB entry among multiple contexts according to some implementations.

FIG. 3 illustrates an example framework 300 including an example TLB 302 to enable sharing of a TLB entry according to some implementations. The TLB 302 includes a plurality of entries 304-1, 304-2, 304-3, . . . , for receiving mapping information. For example, each entry 304 may receive mapping information including a virtual address 306, a physical address 308, and zero or more attributes 310. Furthermore, an entry 304 may have one or more hardware context identifiers 312 associated with the entry 304. For example, an entry 304 may be initially created in association with a first hardware context 114 or thread 112. Consequently, an ID 312 corresponding to at least one of the associated hardware context 114 or thread 112 may be included in each entry 304, or otherwise associated with the entry 304. Thus, the IDs 312 may be hardware context IDs, thread IDs, or any other suitable identifier or other information to associate at least one of a thread 112 or hardware context 114 with a TLB entry 304.

As an illustrative example, suppose that initially the only entry in the TLB 302 is entry 304-2 and that the only hardware context ID 312 associated with the entry 304-2 is "HC0." Further, suppose that the control logic 110 receives a mapping request that includes a virtual address 314 having a value "Z" and a hardware context ID 316 having a value "HC1." Furthermore, rather than receiving an actual ID 316, in some examples, the control logic 110 may receive any information that enables the control logic 110 to associate the mapping request with a particular hardware context or thread. The control logic 110 may compare the received virtual address 314 with the existing entry 304-2 in the TLB 302. If no match is found, the control logic 110 proceeds in a conventional manner and generates a new TLB entry 304-1, which may include the virtual address "Z," a physical address "W" and attributes "A, C, E." Furthermore, the control logic 110 may associate the hardware context ID "HC1" with the entry 304-1.

As another example, suppose that the control logic 110 receives a mapping request that includes a virtual address 314 having a value "X" and a hardware context ID 316 having a value "HC2." The control logic 110 may compare the received virtual address 314 with the existing entries 304-1 and 304-2 and determine that the virtual address "X" matches the existing entry 304-2. Furthermore, the control logic 110 may determine that the only hardware context ID currently associated with the entry 304-2 is "HC0." Consequently, as indicated at 318 when a matching virtual address is found, but for a different hardware context, the control logic 110 may initiate fetching of new mapping information for the new hardware context, i.e., hardware context HC2. As indicated at 322, when a mapping is found for a different hardware context (i.e., HC0), then as indicated at 324 the control logic 110 compares mapping information of the existing entry 304-2 with the new mapping information obtained at 320 for the new hardware context. For example, the control logic 110 may compare the physical address 308 and attributes 310 to determine whether there is a match. In this example, suppose that the fetch operation at 320 returns a physical address having a value "Y" and attributes having values "A, B, C." The control logic 110 may determine that the physical address and the attributes for the new hardware context match those of the existing entry 304-2. Accordingly, as indicated at 326, if the mappings are equivalent, the new hardware context ID is added to the existing entry 304-2 and associated with the existing mapping information. Thus, as indicated at 326, the hardware context ID HC2 is added to the existing entry 304-2. Consequently, the next time that the control logic 110 receives a request for the virtual address "X" in the context of either HC0 or HC2 (or a respective corresponding thread), the control logic 110 may immediately return the mapping information maintained in the existing entry 304-2.

As still another example, suppose that the control logic 110 receives a mapping request that includes a virtual address 314 having a value "X" and a hardware context ID 316 having a value "HC3." The control logic 110 may compare the received virtual address 314 with the existing entries 304-1 and 304-2 and determine that the virtual address "X" matches the existing entry 304-2. Furthermore, the control logic 110 may determine that the hardware context IDs currently associated with the entry 304-2 are "HC0" and "HC2." Consequently, as indicated at 318 when a virtual address is found for a different hardware context, the control logic 110 may initiate fetching of new mapping information for the new hardware context, i.e., hardware context HC3. As indicated at 322, when the mapping is found for different hardware context (i.e., HC0), then as indicated at 324 the control logic 110 compares mapping information of the existing entry 304-2 with the new mapping information obtained at 320 for the new hardware context. For example, the control logic 110 may compare the physical address 308 and attributes 310 to determine whether there is a match. In this example, suppose that the fetch operation at 320 returns a physical address having a value "Y" and attributes having values "A, D." The control logic 110 may determine that the physical address for the new hardware context matches that of the existing entry 304-2, but the attributes 310 are different. Accordingly, as indicated at 328, if the mapping informations are not equivalent, a new entry 304-3 is allocated in the TLB 302 to receive the new mapping information associated with the hardware context HC3.

Furthermore, it may be noted that the attributes 310 need not always be exactly the same to obtain a determination of equivalence. For example, some attributes 310 may not be relevant to the determination of equivalence as some particular attributes 310 may have no bearing on the mapping information returned by the control logic 110 in response to a request. Accordingly, in some implementations, two mappings may be "equivalent" when the results of the mapping would be indistinguishable from the results that would be obtained if those contexts had separate mapping information in separate entries 304. This includes at least matching virtual address and physical address mappings, as well as any other information required for producing the same mapping results, such as matching attributes related to read permissions, write permissions, user/supervisor access permissions, or other access permissions, page size, memory type, virtual machine information, and the like.

Example Processes

Figure 4:
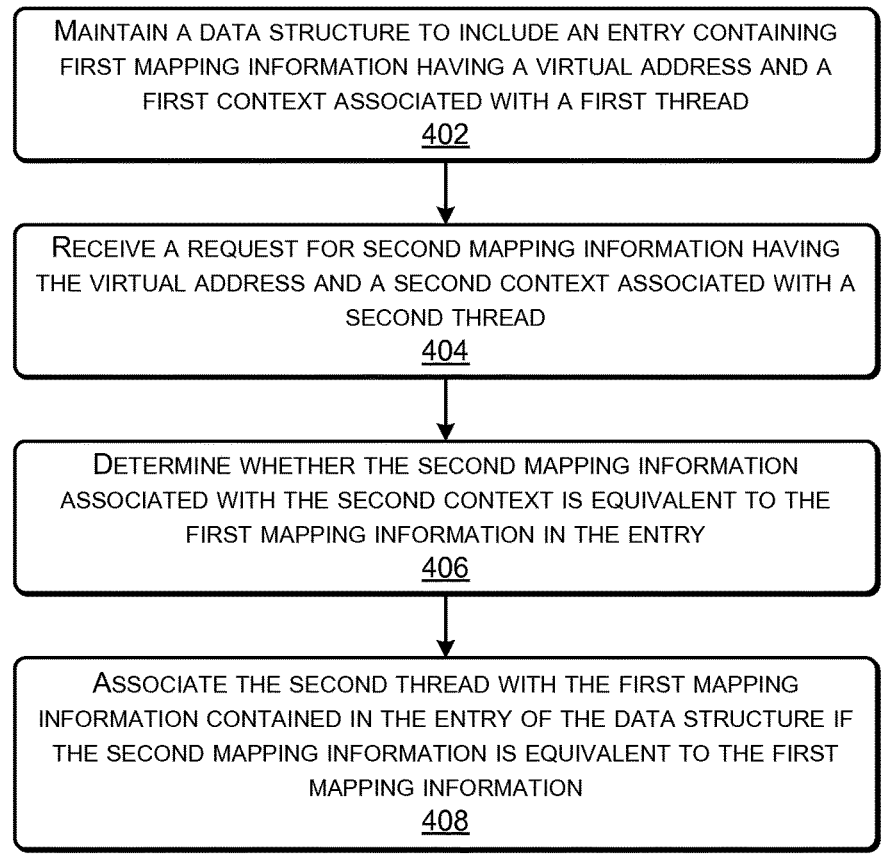
FIG. 4 is a block diagram illustrating an example process for determining whether to share a TLB entry among multiple contexts according to some implementations.
Figure 5:
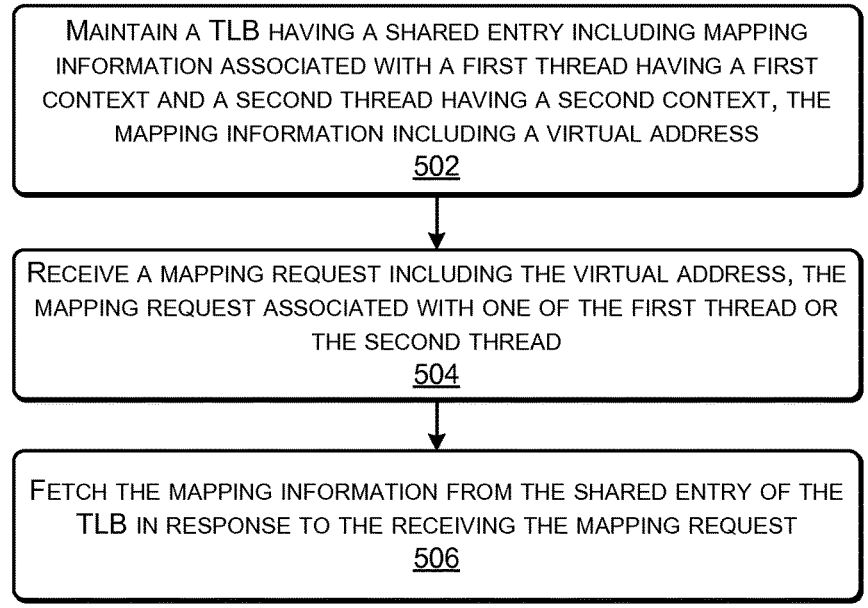
FIG. 5 is a block diagram illustrating an example process for sharing a TLB entry among multiple contexts according to some implementations.
Figure 6:
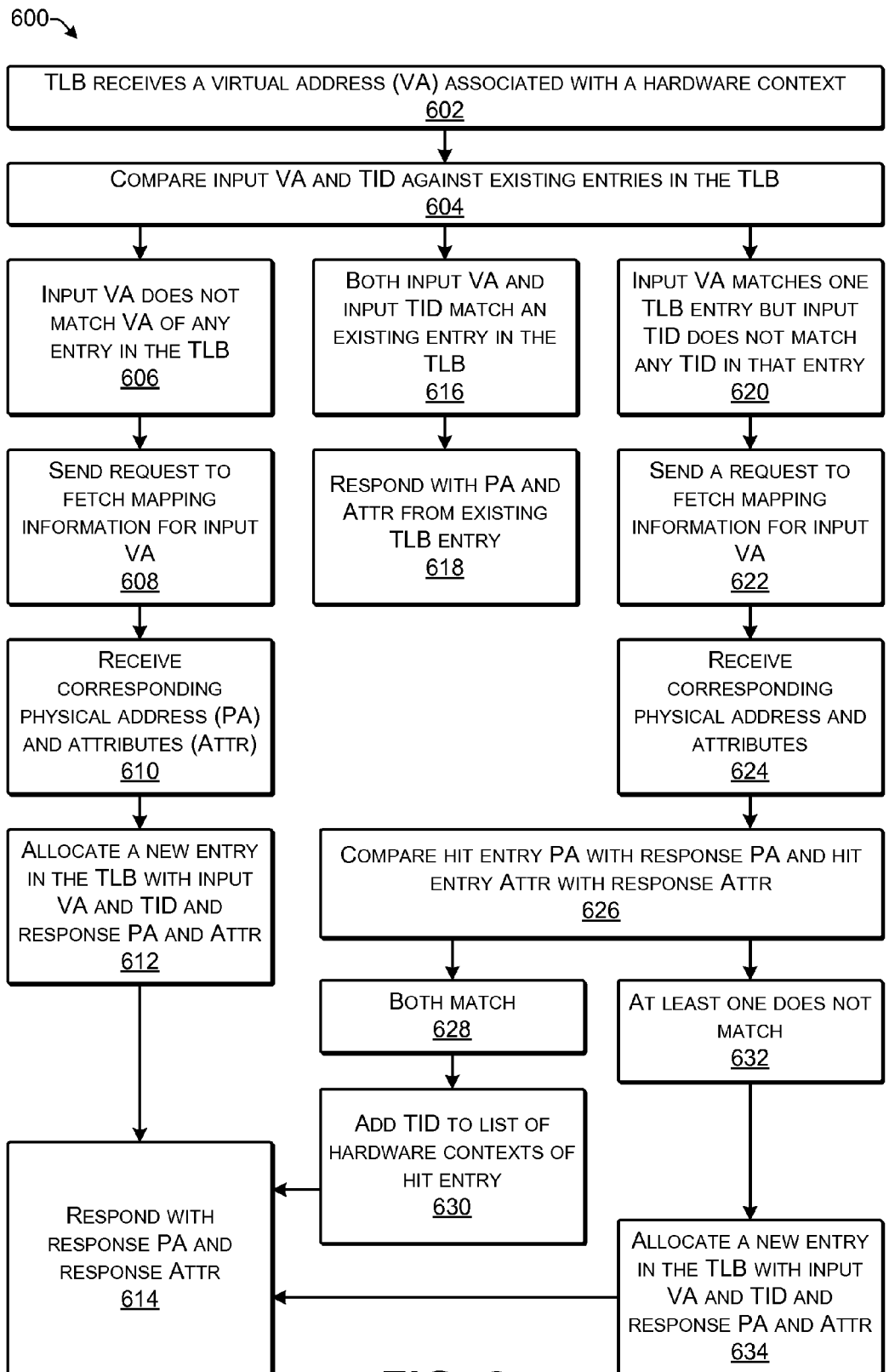
FIG. 6 is a block diagram illustrating an example process for determining whether to share a TLB entry among multiple contexts according to some implementations according to some implementations.

FIGS. 4-6 illustrate example processes for implementing the techniques described herein. The processes are illustrated as a collection of operations in logical flow graphs, which represent a plurality of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. In some examples, some or all of the operations may be executed through microcode, hardcoded instructions, firmware, or other low-level instructions not visible outside of the processor, but executable by the processor, a microcontroller, or the like. The order in which the operations are described is not intended to be construed as a limitation. Any number of the described blocks can be combined in any order and/or in parallel to implement the process, and not all of the blocks need be executed. For discussion purposes, the processes are described with reference to the processors, frameworks, architectures, apparatuses and environments described in the examples herein, although the processes may be implemented in a wide variety of other processors, frameworks, architectures, apparatuses or environments.

FIG. 4 is a flow diagram illustrating an example process 400 for determining whether to share a TLB entry according to some implementations. The process 400 may be executed by the control logic(s) 110, which may include suitable code, instructions, controllers, dedicated circuits, or combinations thereof, as mentioned above.

At 402, a data structure is maintained to include an entry containing first mapping information having a virtual address and a first context associated with a first thread. For example, a TLB may include one or more entries containing mapping information associated with one or more threads and associated hardware contexts.

At 404, the control logic 110 may receive a request for second mapping information. The request may include the virtual address corresponding to the first mapping information in the entry in the TLB. The request for the second mapping information may include a second context associated with a second thread.

At 406, the control logic 110 may determine whether the second mapping information associated with the second context is equivalent to the first mapping information contained in the entry in the data structure. For example, the control logic 110 may fetch or may send a request to fetch the second mapping information, such as from a page walk, and may compare the second mapping information with the first mapping information. The comparing may include comparing physical addresses and any attributes associated with the second mapping information and the first mapping information.

At 408, the control logic may associate the second thread with the first mapping information contained in the entry of the data structure if the second mapping information is equivalent to the first mapping information. For example, the control logic may add an identifier or other information to the entry in the data structure to indicate that the entry is also associated with the second thread in addition to being associated with the first thread. Subsequently, the first thread and the second thread may share the entry in the data structure.

FIG. 5 is a flow diagram illustrating an example process 500 for sharing a TLB entry according to some implementations. The process 500 may be executed by the control logic(s) 110, which may include suitable code, instructions, controllers, dedicated circuits, or combinations thereof, as mentioned above.

At 502, a TLB is maintained with a shared entry including mapping information associated with a first thread having a first context and a second thread having a second context. The mapping information may include a virtual address.

At 504, the control logic receives a mapping request including the virtual address included in the shared entry. The mapping request may be associated with one of the first thread or the second thread.

At 506, the control logic fetches the mapping information from the shared entry of the TLB in response to receiving the mapping request. For example, the control logic may determine that the shared entry is associated with the one of the first thread or the second thread and may immediately fetch and return the mapping information in response to receiving the mapping request.

FIG. 6 is a flow diagram illustrating an example process 600 for determining whether to share a TLB entry according to some implementations. The process 600 may be executed by the control logic(s) 110, which may include suitable code, instructions, controllers, dedicated circuits, or combinations thereof, as mentioned above.

At 602, a TLB receives an input virtual address (VA) associated with a hardware context or thread. For example, the control logic 110 may receive a mapping request associated with a particular thread or hardware context. The mapping request may include a virtual address or range of virtual addresses.

At 604, the control logic 110 compares the input virtual address and a thread ID (TID) against existing entries in the TLB. For example, the control logic may determine whether any existing entries in the TLB have the same virtual address and thread ID.

At 606, if the input virtual address does not match the virtual addresses of any entries in the TLB then the process goes to block 608.

At 608, the control logic sends a request to fetch mapping information for the input virtual address. For example, the control logic 110 may send a request to another logic unit to perform a lookup of one or more page tables to determine the mapping information. Alternatively, the control logic 110 may itself perform the lookup of the page table.

At 610, the control logic 110 receives the mapping information including a corresponding physical address and any attributes associated with the mapping information. For example, zero or more attributes may be associated with the mapping information such as read and write privileges, other access privileges, and so forth, as discussed above.

At 612, the control logic 110 allocates a new entry in the TLB with the input virtual address, the response physical address and any associated attributes. Furthermore, the control logic 110 may associate the newly allocated entry in the TLB with the thread ID of the thread or hardware context associated with the mapping request.

At 614, the control logic 110 responds to the mapping request with the response physical address and any associated attributes.

At 616, on the other hand, if both the input virtual address and the input thread ID match an existing entry in the TLB the process goes to block 618.

At 618, the control logic 110 responds to the mapping request with the physical address and any attributes from the existing TLB entry that was determined to be a match in blocks 604 and 616.

At 620, alternatively, if the input virtual address matches a TLB entry but the input thread ID does not match any thread ID in that entry then the process goes to block 622.

At 622, the control logic 110 sends a request to fetch mapping information for the input virtual address. As discussed above with respect to block 608, the control logic 110 may send a request for a page walk, or may conduct the page walk itself.

At 624, the control logic 110 receives the corresponding physical address and any attributes as the mapping information.

At 626, the control logic 110 compares the hit entry physical address with the response physical address and compares the hit entry attributes with the response attributes to determine whether they are equivalent. As mentioned above, equivalence may be determined to exist when the physical addresses and the attributes both match. Furthermore, in some instances, equivalence may still be determined even if one or more attributes do not match, depending on the particular nature of the attributes do not match.

At 628, if both the physical addresses and the attributes match, the process proceeds to block 630.

At 630, the control logic 110 adds the thread ID to the list of hardware contexts associated with the hit entry in the TLB. For example, the control logic 110 may store an identifier for the thread in the TLB entry, or may otherwise associate the thread with the TLB entry. The process may then proceed to block 614 as described above.

At 632, on the other hand, if at least one of the physical address or the attributes does not match with the existing entry in the TLB, the process goes to block 634.

At 634, the control logic 110 allocates a new entry in the TLB using the input virtual address, the response physical address, and any attributes. The control logic 110 may associate the thread with the new entry, such as by including thread ID in the new entry in the TLB. The process may then proceed to block 614 as described above.

From the foregoing, it may be noted that implementations need not assume anything about software contexts, but instead obtain and compare actual mappings of two different hardware contexts. Accordingly, the mapping information corresponding to each sharing context is fetched at least once from the page table(s). However, implementations herein achieve savings over conventional processes that do not actually compare mapping information by reducing the complexity and structures required to guarantee that both mappings will be equivalent. Further, the example processes described herein are only several nonlimiting example of processes provided for discussion purposes. Numerous other variations will be apparent to those of skill in the art in light of the disclosure herein.

Example Architectures

Figure 7:
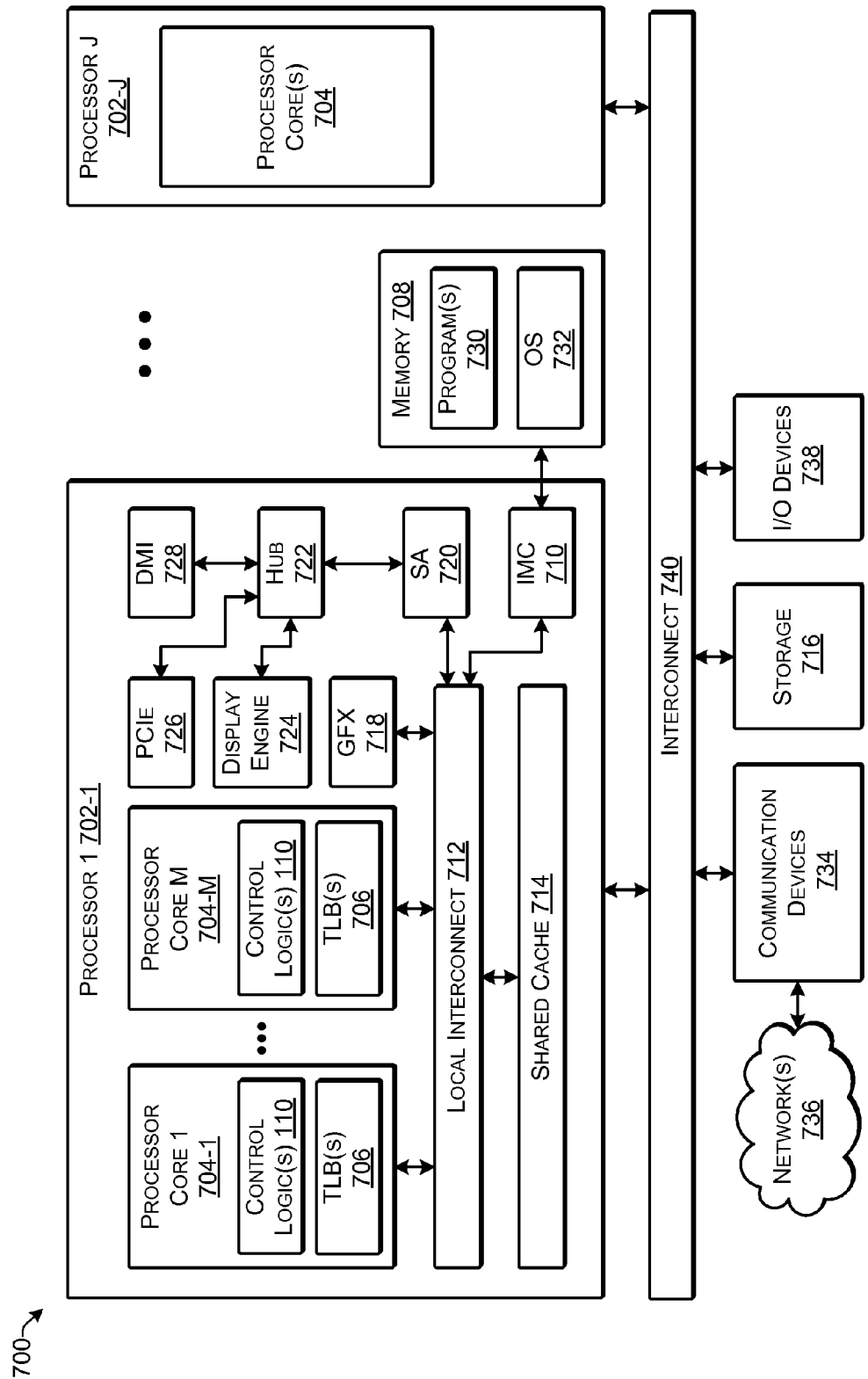
FIG. 7 illustrates an example architecture of a system including one or more TLBs to be shared between a plurality of contexts according to some implementations.

FIG. 7 illustrates nonlimiting select components of an example system 700 according to some implementations herein that may include one or more instances of the processors 100 and/or 200 discussed above for implementing the framework 300 and TLB(s) described herein. The system 700 is merely one example of numerous possible systems and apparatuses that may implement sharing of TLB entries between hardware contexts, such as discussed above with respect to FIGS. 1-6. The system 700 may include one or more processors 702-1, . . . , 702-J (where J is a positive integer≥1), each of which may include one or more processor cores 704-1, . . . , 704-M (where M is a positive integer≥1). In some implementations, as discussed above, the processor(s) 702 may be a single core processor, while in other implementations, the processor(s) 702 may have a large number of processor cores 704, each of which may include some or all of the components illustrated in FIGS. 1 and/or 2. For example, each processor core 704-1, . . . , 704-M may include an instance of control logic(s) 110 for enabling sharing of one or more entries of one or more TLBs 706 maintained for a respective processor core 704-1 . . . , 704-M. As mentioned above, the control logic 110 may include or may be included in one or more of a controller, dedicated circuits, logic units, microcode, operating system code, or the like.

The processor(s) 702 and processor core(s) 704 can be operated, via an integrated memory controller (IMC) 710 in connection with a local interconnect 712, to read and write to a memory 708. The processor(s) 702 and processor core(s) 704 can be operated to fetch and execute computer-readable instructions stored in a memory 708 or other computer-readable media. The memory 708 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 704, in some implementations, the multiple processor cores 704 may share a shared cache 714, such as an L3 cache. Additionally, storage 716 may be provided for storing data, code, programs, logs, and the like. The storage 716 may include solid-state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 700, the memory 708 and/or the storage 716 may be a type of computer-readable storage media and may be a non-transitory media.

In various implementations, the local interconnect 712 may also communicate with a graphical controller (GFX) 718 to provide graphics processing. In some embodiments, the local interconnect 712 may communicate with a system agent 720. The system agent 720 may be in communication with a hub 722, which connects a display engine 724, a Peripheral Component Interconnect Express (PCIe) connection 726, and a direct media interface (DMI) 728.

The memory 708 may store functional components that are executable by the processor(s) 702. In some implementations, these functional components comprise instructions or programs 730 that are executable by the processor(s) 702. The example functional components illustrated in FIG. 7 further include an operating system (OS) 732 to mange operation of the system 700. In some instances, the OS 732 may include or may contribute to the control logic 110 for managing the TLBs 706.

The system 700 may include one or more communication devices 734 that may include one or more interfaces and hardware components for enabling communication with various other devices over a communication link, such as one or more networks 736. For example, communication devices 734 may facilitate communication through one or more of the Internet, cable networks, cellular networks, wireless networks (e.g., Wi-Fi, cellular) and wired networks. Components used for communication can depend at least in part upon the type of network and/or environment selected.

Protocols and components for communicating via such networks are well known and will not be discussed herein in detail.

The system 700 may further be equipped with various input/output (I/O) devices 738. Such I/O devices 738 may include a display, various user interface controls (e.g., buttons, joystick, keyboard, touch screen, etc.), audio speakers, connection ports and so forth. An interconnect 740 may be provided to enable communication between the processors 702, the memory 708, the storage 716, the communication devices 734, and the I/O devices 738. The interconnect 740 may be any of, or any combination of, multiple different kinds of interconnects, which may include a system bus, point-to-point interfaces, a chipset, a shared interconnect, a mesh interconnect, a ring interconnect, or other suitable connections and components.

For discussion purposes, this disclosure provides various example implementations as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A processor comprising:
a translation lookaside buffer (TLB) to include an entry containing shared mapping information including a mapping of a virtual address to a physical address and one or more attributes associated with a context of a first thread and a context of a second thread; and
a control logic circuit to:
compare a physical address and one or more attributes corresponding to a mapping request for an input virtual address to the physical address and the one or more attributes in the entry of the TLB, and
allocate a new entry in the TLB if at least one of:
the physical address corresponding to the mapping request for the input virtual address does not match the physical address in the entry, or
the one or more attributes corresponding to the mapping request for the input virtual address do not match the one or more attributes in the entry, wherein the one or more attributes in the entry comprise user/supervisor access permissions.

2. The processor as recited in claim 1 further comprising a plurality of registers, the context of the first thread comprising a first hardware context to include one or more first registers of the plurality of registers allocated to the first thread, and the context of the second thread comprising a second hardware context to include one or more second registers of the plurality of registers allocated to the second thread.

3. The processor as recited in claim 1 in which at least the first thread and the second thread are to execute on the processor contemporaneously.

4. The processor as recited in claim 1, the control logic circuit further comprising a logic circuit to request fetching of new mapping information in response to the mapping request if none of the contexts stored in the entry of the TLB match a context corresponding to the mapping request.

5. The processor as recited in claim 1, the control logic circuit further comprising a logic circuit to, if none of the contexts stored in the entry of the TLB match a context corresponding to the mapping request, add the context corresponding to the mapping request to the entry if the physical address corresponding to the mapping for the input virtual address matches the physical address in the entry, and the one or more attributes corresponding to the mapping request for the input virtual address match the one or more attributes in the entry.

6. The processor as recited in claim 1 in which the processor includes multiple processor cores, the TLB and the control logic circuit corresponding to a first processor core of the multiple processor cores, the first thread and the second thread to execute on respective first and second logical processors provided by the first processor core.

7. A processor comprising:
a data structure to include an entry containing first mapping information having a mapping of a virtual address to a physical address, one or more attributes, and a first context associated with a first thread; and
a control logic circuit to:
receive a mapping request that includes a virtual address and a second context associated with a second thread, and
when the virtual address in the entry matches the virtual address of the mapping request and the second context does not match the first context:
to allocate a new entry in the data structure if at least one of:
a physical address corresponding to the virtual address of the mapping request does not match the physical address in the entry, or
one or more attributes corresponding to the mapping request do not match the one or more attributes in the entry, and
to add the second context to the first mapping information contained in the entry if the physical address corresponding to the virtual address of the mapping request matches the physical address in the entry, and the one or more attributes corresponding to the mapping request match the one or more attributes in the entry, wherein the one or more attributes in the entry comprise user/supervisor access permissions.

8. The processor as recited in claim 7, the control logic circuit further comprising a logic circuit to respond to the mapping request with the physical address in the entry when the virtual address in the entry matches the virtual address of the mapping request and the second context matches the first context.

9. The processor as recited in claim 7, wherein the one or more attributes in the entry comprises at least one of an access permission attribute, a processing privilege attribute, a page attribute, and a memory location attribute.

10. The processor as recited in claim 7, the control logic circuit further comprising a logic circuit to, when the virtual address in the entry does not match the virtual address of the mapping request, allocate a new entry in the data structure.

11. The processor as recited in claim 7 further comprising a plurality of registers, the first context comprising a first hardware context to include one or more first registers of the plurality of registers allocated to the first thread, and the second context comprising a second hardware context to include one or more second registers of the plurality of registers allocated to the second thread.

12. The processor as recited in claim 7 in which the data structure is a translation lookaside buffer (TLB) and the processor includes multiple processor cores, the TLB and the control logic circuit corresponding to a first processor core of the multiple processor cores.

13. A method comprising:
    maintaining first mapping information associated with a first context in an entry of a data structure, the first mapping information including a mapping of a first virtual address to a first physical address and one or more attributes;
    receiving a request for second mapping information associated with a second context, the second mapping information including a mapping of the first virtual address to a second physical address and one or more attributes;
    comparing the first mapping information with the second mapping information; and
    allocating a new entry in the data structure if at least one of:
        the first physical address does not match the second physical address, or
        the one or more attributes of the first mapping information do not match the one or more attributes of the second mapping information, wherein the one or more attributes in the entry comprise user/supervisor access permissions.

14. The method as recited in claim 13 further comprising:
    receiving a subsequent request for mapping information including the first virtual address and the first context; and
    returning the first physical address.

15. The method as recited in claim 13 further comprising, prior to the comparing, fetching the second mapping information from one or more page tables in response to the request for second mapping information.

16. The method as recited in claim 13 further comprising adding the second context to the first mapping information if the first physical address matches the second physical address, and the one or more attributes of the first mapping information match the one or more attributes of the second mapping information.

17. The method as recited in claim 13 wherein the first context is a hardware context associated with a first thread of execution to execute on a processor and the second context is a second hardware context associated with a second thread of execution to execute on the processor contemporaneously with the first thread.

18. A system comprising:
    a processor;
    a memory to maintain a translation lookaside buffer (TLB), the TLB having an entry including mapping information associated with a first thread having a first context and a second thread having a second context, the mapping information including a mapping of a virtual address to a physical address and one or more attributes associated with the first context and the second context; and
    a control logic circuit to:
        compare a physical address and one or more attributes corresponding to a mapping request for an input virtual address to the physical address and the one or more attributes in the entry of the TLB, and
        allocate a new entry in the TLB if at least one of:
            the physical address corresponding to the mapping request for the input virtual address does not match the physical address in the entry, or
            the one or more attributes corresponding to the mapping request for the input virtual address do not match the one or more attributes in the entry, wherein the one or more attributes in the entry comprise user/supervisor access permissions.

19. The system as recited in claim 18, the control logic circuit further comprising a logic circuit to:
    receive another mapping request including the virtual address for mapping information associated with a third thread having a third context;
    fetch the mapping information associated with the third thread;
    comparing the mapping information associated with the third thread with the mapping information included in the entry; and
    associating the third thread with the entry when the mapping information associated with the third thread is equivalent to the mapping information included in the entry.

20. The system as recited in claim 18 further comprising a plurality of registers, the first context of the first thread comprising a first hardware context to include one or more first registers of the plurality of registers allocated to the first thread, and the second context of the second thread comprising a second hardware context to include one or more second registers of the plurality of registers allocated to the second thread.

* * * * *